US011260796B2

(12) United States Patent
Stojkovic et al.

(10) Patent No.: US 11,260,796 B2
(45) Date of Patent: Mar. 1, 2022

(54) DETACHABLE WORKPIECE SUPPORT APPARATUS FOR A TAILGATE STEP

(71) Applicant: Ford Global Technologies, LLC, Dearborn, MI (US)

(72) Inventors: Dragan B. Stojkovic, Taylor, MI (US); Joshua R. Hemphill, White Lake, MI (US); Jack Marchlewski, Saline, MI (US); Robert Reiners, Grosse Ile, MI (US); Jeffrey Hemphill, Tawas City, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 191 days.

(21) Appl. No.: 16/130,297

(22) Filed: Sep. 13, 2018

(65) Prior Publication Data

US 2019/0009725 A1    Jan. 10, 2019

Related U.S. Application Data

(62) Division of application No. 15/232,958, filed on Aug. 10, 2016, now Pat. No. 10,106,087.

(51) Int. Cl.
*B60R 3/00* (2006.01)
*B60R 3/02* (2006.01)
*B60P 3/14* (2006.01)
*B62D 33/027* (2006.01)

(52) U.S. Cl.
CPC .................. *B60R 3/02* (2013.01); *B60P 3/14* (2013.01); *B62D 33/0273* (2013.01)

(58) Field of Classification Search
CPC .. B60R 3/02; B60R 3/00; B60R 3/007; B60R 9/06; B60R 9/00; B60R 9/045; B62D 33/03; B62D 33/0273; B62D 33/023; B62D 33/027
See application file for complete search history.

(56) References Cited

U.S. PATENT DOCUMENTS

| 4,846,487 A * | 7/1989 | Criley ................ B60R 3/02 280/166 |
| 5,549,312 A | 8/1996 | Garvert |
| 5,687,813 A * | 11/1997 | Bensch ................ B60R 3/007 182/127 |
| 5,803,523 A * | 9/1998 | Clark ................ B60P 1/435 14/71.1 |
| 5,941,342 A | 8/1999 | Lee |
| 6,224,127 B1 | 5/2001 | Hodge |
| 6,918,624 B2 | 7/2005 | Miller et al. |
| 6,966,597 B2 | 11/2005 | Tegtmeier |
| 6,988,756 B1 * | 1/2006 | Meinke ................ B60P 3/40 296/26.08 |

(Continued)

*Primary Examiner* — James M Dolak
(74) *Attorney, Agent, or Firm* — David L. Coppiellie; Brooks Kushman P.C.

(57) ABSTRACT

A workpiece support is provided for a pickup truck tailgate. The tailgate includes a retractable step including a pair of step support members. The attachment brackets include a workpiece support bar and a riser that are attached to the step support members and to each other at a right angle. The workpiece support bar and riser may be fixedly attached to each other or attached by a pivot connector. Detachable connectors are provided to connect a workpiece support bar and riser detachably to the step support members.

7 Claims, 1 Drawing Sheet

(56) References Cited

U.S. PATENT DOCUMENTS

| | | | |
|---|---|---|---|
| 7,055,838 B2 | 6/2006 | Lambie | |
| 7,080,713 B1 * | 7/2006 | Riggs | B60R 3/02 |
| | | | 182/127 |
| 7,111,858 B2 * | 9/2006 | Manser | B60R 3/02 |
| | | | 182/127 |
| 7,232,173 B2 | 6/2007 | Katterloher et al. | |
| 7,240,947 B2 | 7/2007 | Kuznarik et al. | |
| 7,712,811 B2 * | 5/2010 | Heaman | B62D 33/0273 |
| | | | 296/26.08 |
| 8,146,786 B2 * | 4/2012 | Cheung | B62D 33/0273 |
| | | | 224/402 |
| 8,201,869 B1 | 6/2012 | Butlin, Jr. et al. | |
| 8,348,325 B2 | 1/2013 | Hausler et al. | |
| 8,444,201 B1 | 5/2013 | Crawford et al. | |
| 8,573,673 B1 | 11/2013 | Puglisi, Sr. | |
| 8,919,853 B2 | 12/2014 | Krishnan et al. | |
| 9,302,719 B1 | 4/2016 | Krishnan et al. | |
| 9,463,746 B2 | 10/2016 | Butlin, Jr. et al. | |
| 9,623,803 B1 | 4/2017 | Martins | |
| 9,623,915 B2 | 4/2017 | Worden et al. | |
| 9,701,225 B1 | 7/2017 | Hogan et al. | |
| 9,758,107 B2 | 9/2017 | Stojkovic et al. | |
| 9,840,201 B2 | 12/2017 | Knodle et al. | |
| 9,840,206 B2 | 12/2017 | Bales et al. | |
| 9,845,041 B1 | 12/2017 | Courtland | |
| 9,855,877 B2 | 1/2018 | Aftanas et al. | |
| 9,862,330 B2 | 1/2018 | Sayegh et al. | |
| 9,862,429 B2 | 1/2018 | Castillo et al. | |
| 9,896,004 B1 | 2/2018 | Kahl et al. | |
| 9,902,306 B1 | 2/2018 | Foss et al. | |
| 9,902,307 B2 | 2/2018 | Higgins | |
| 9,902,328 B1 | 2/2018 | Mazur | |
| 9,903,121 B2 | 2/2018 | Tompkins et al. | |
| 9,926,018 B2 | 3/2018 | Spahn et al. | |
| 9,956,924 B2 | 5/2018 | Nania | |
| 9,956,995 B1 | 5/2018 | Neighbors et al. | |
| 10,106,087 B2 * | 10/2018 | Stojkovic | B60P 3/14 |
| 10,106,208 B2 * | 10/2018 | Barrios Albert | B62D 33/03 |
| 10,464,618 B2 * | 11/2019 | Loew | B62D 33/0273 |
| 10,661,842 B2 * | 5/2020 | Povinelli | B60R 7/005 |
| 10,994,660 B2 * | 5/2021 | Ngo | B62D 33/03 |
| 2001/0042985 A1 | 11/2001 | Hodge | |
| 2002/0070577 A1 | 6/2002 | Pool, III et al. | |
| 2011/0168491 A1 | 7/2011 | Chaeatham, Jr. | |

* cited by examiner

DETACHABLE WORKPIECE SUPPORT APPARATUS FOR A TAILGATE STEP

REFERENCE TO RELATED APPLICATIONS

This application is a division of U.S. application Ser. No. 15/232,958 filed Aug. 10, 2016, now U.S. Pat. No. 10,106,087 issued Oct. 23, 2018, the disclosure of which is hereby incorporated in its entirety by reference herein.

TECHNICAL FIELD

This disclosure relates to a sawhorse attachment for a pick-up truck tailgate that includes a retractable step assembly.

BACKGROUND

Pick-up trucks are widely used for transporting cargo and people to job sites and are used for a wide variety of types of work. Home owners, carpenters, plumbers and many other trades rely on pick-up trucks to get a job done. The tailgate of a pick-up truck provides access to the truck bed when opened and keeps cargo in the truck bed when closed. The tailgate when opened is frequently used to provide a work surface or seating area. The tailgate should be protected when used as a work surface to prevent drilling or cutting into the tailgate while working on an article.

Applicant has developed and patented (U.S. Pat. No. 6,918,624) a "flip out step" or retractable step assembly that is retracted into the tailgate for storage and extended to provide a step to facilitate climbing into and out of the truck bed. The retractable step assembly is a popular feature with consumers but is not designed to do support a workpiece.

This disclosure is directed to solving the above problems and other problems as summarized below.

SUMMARY

According to one aspect of this disclosure, a workpiece support apparatus is provided for a pickup truck tailgate including a step and a pair of step support members. The workpiece support apparatus comprises right and left attachment assemblies each including a workpiece support bar that is attached to one of the step support members. The workpiece support bars extend rearwardly from a top/rear edge of the tailgate when the tailgate is in an open position. A riser is attached to each of the step support members and workpiece support bar.

According to other aspects of this disclosure relating to the workpiece support apparatus, a distal end of each of the workpiece support bars may be fixedly connected at a right angle to a top end of each of the risers. Alternatively, the attachment assembly may include a pivot connector that pivotally secures the distal end of the workpiece support bar to a top end of the riser.

The step support members may each include a tailgate end located where the step support members are pivotally attached at the tailgate and a step end that is connected to the step. The right and left attachment assemblies may each further comprise a first connector detachably connecting the workpiece support bar to the tailgate end of one of the step support members. A second connector may detachably connect the riser to the step end of one of the step support members. The first and second connectors may be pins having a pull ring that may be grasped to remove and install the pins. A detent ball may be provided that retains the pins in the workpiece support bars and in the risers. The workpiece support bars and the risers may be three-sided channels each defining an open side that receives a portion of the step support members in the open side.

According to another aspect of this disclosure, a truck tailgate assembly is provided that includes a step attached to the tailgate by a pair of step support members that are received in a receptacle defined by the tailgate. The step is extendable from the receptacle. A pair of workpiece support brackets are attached to the step support members to provide a pair of spaced workpiece support bars. The workpiece support bars are provided above the step and rearward of the tailgate when the tailgate is open.

According to additional aspects relating to the truck tailgate assembly, a workpiece support bar may be attached to one of the step support members and may extend rearward from a top/rear edge of the tailgate when the tailgate is open. A riser may be attached to one of the step support members and the workpiece support bar. A distal end of each of the workpiece support bars may be fixedly connected at a right angle to a top end of each of the risers. The step support members may each include a tailgate end where the step support members are pivotally attached to the tailgate and a step end connected to the step. Right and left attachment assemblies may each further comprise a first connector for detachably connecting a workpiece support bar to the tailgate end of one of the step support members and a second connector a second connector detachably connecting the riser to the step end of one of the step support members.

According to another aspect of this disclosure, a pickup truck is disclosed that includes a truck bed and a step supported on step support tubes that are extended from the tailgate when the tailgate is open. A pair of brackets are each attachable to one of the step support tubes to provide a workpiece support surface. According to other aspects of this disclosure relating the pickup truck embodiment, the workpiece support bars may be connected at a right angle to a top end of each of the risers.

The above aspects of this disclosure and other aspects will be described below with reference to the attached drawings.

DETAILED DESCRIPTION

Figures 1, 2, 3:
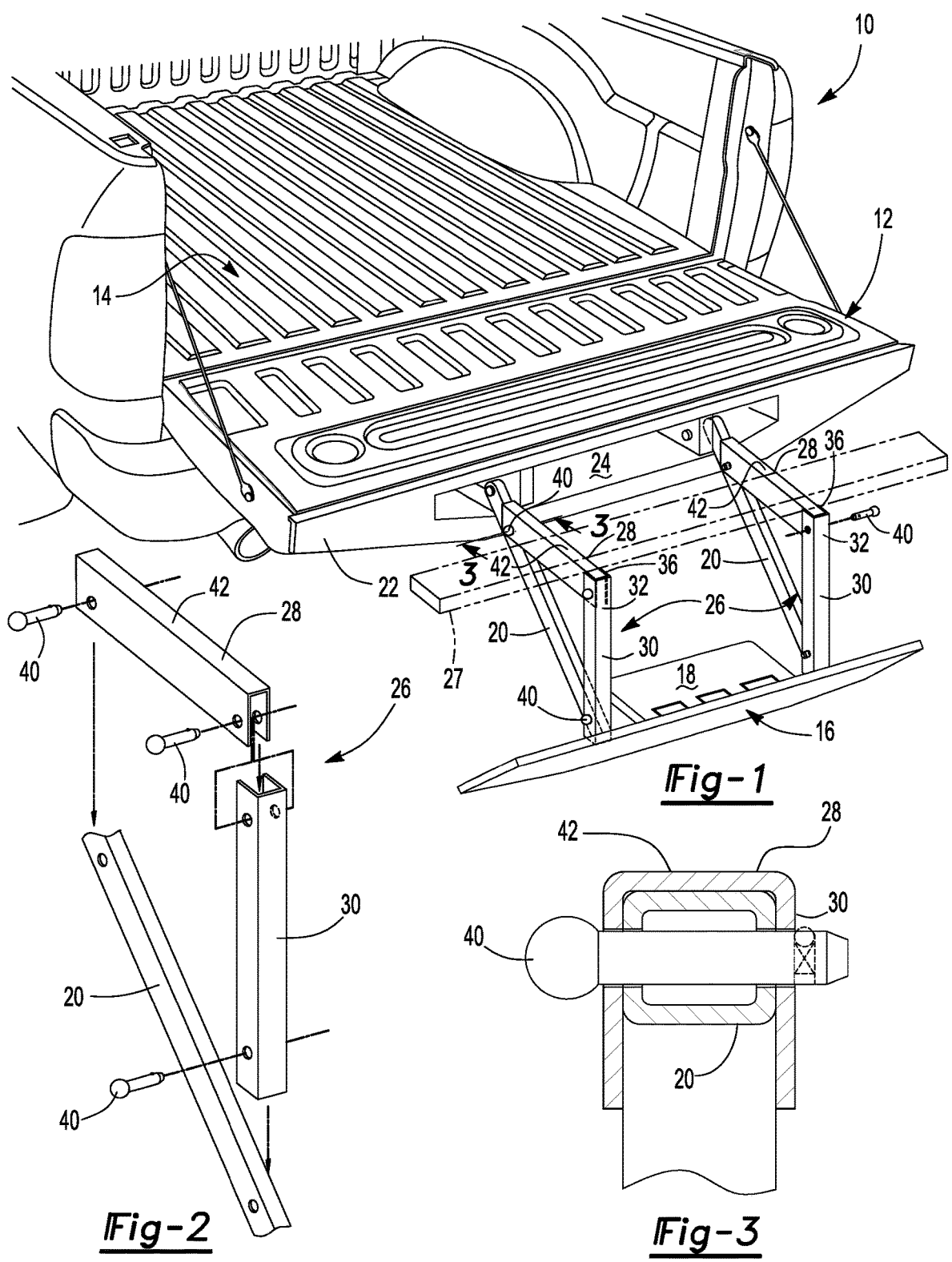
FIG. 1 is a fragmentary perspective view of a pickup truck having a tailgate that is provided with a step and workpiece support brackets.
FIG. 2 is an exploded perspective view of the workpiece support brackets shown with a step support member.
FIG. 3 is a cross-sectional view taken along the line 3-3 in FIG. 1.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, a pickup truck 10 is partially shown that includes a tailgate 12 attached to the rear portion of a truck bed 14. The tailgate 12 is provided with a retractable step assembly 16. The retractable step assembly 16 is retracted into the tailgate 12 when not in use but may be extended from the tailgate 12 when the tailgate 12 is open or in its open position. The retractable step assembly 16 includes a step 18 that is adapted to receive a person's foot to facilitate stepping into the truck bed 14.

The retractable step assembly 16 is supported on a pair of step support members 20. The step support members 20 are extended and retracted from the tailgate 12 when the retractable step assembly 16 is extended and retracted. The retractable step assembly 16 when extended is oriented below and rearward of the tailgate 12.

A top/rear edge 22 of the tailgate 12 is the top of the tailgate 12 when the tailgate is closed and is the rear edge of the tailgate 12 when the tailgate is in its open position. An opening 24 is provided in the top/rear edge 22 of the tailgate 12. The step support members 20 are received in the opening 24 when the retractable step assembly 16 is retracted. The retractable step assembly 16 is configured to close the opening 24 on the top/rear edge 22 of the tailgate 12.

A pair of workpiece support apparatus 26, or work support brackets, are designed to be attached to the step support members 20 or otherwise connected to the retractable step assembly 16 to provide workpiece supports above the step 18 and rearward of the top/rear edge 22 of the tailgate 12. The workpiece support brackets may, for example, be used to support a board, or workpiece 27, on a workpiece support bar 28 that is part of the workpiece support apparatus 26. The workpiece 27 may be placed on the workpiece support bars 26 to be cut or drilled or nailed, etc. and eliminates the risk of damaging the tailgate 12. A riser 30 is attached to the workpiece support bar 28. The riser 30 and workpiece support bar 28 may be fixedly connected together by welding or the like or may be pivotally connected as will be described below. A distal end 32 of workpiece support bar 28 is connected to the riser 30.

The workpiece support bar 28 is also pivotally connected to a telescoping support 34. The telescoping support 34 is received within the opening 24 in the tailgate 12. The telescoping support 34 is part of the tailgate 12 and retractable step assembly 16.

A top end 36 of the risers 30 is connected to the distal end 32 of the workpiece support bar 28. A pivot connector, that may be provided as a ring pull pin 40, may be used to connect the top end 36 and distal end 32 together in a pivotal manner to allow for limited adjustment of the attachment assemblies 26.

Ring pull pins 40, as shown is FIGS. 2 and 3, may be used to connect the attachment assemblies 26 to the step support members 20. One ring pull pin 40 may be used to connect one of the workpiece support bars 28 to the step support member 20. Another ring pull pin 40 may be used to connect a riser 30 to the step support member 20.

Referring to FIGS. 4 and 5, the tailgate 12, retractable step assembly 16 and workpiece support apparatus 26, or work support brackets, are shown in side elevation and rear elevation respectively. The retractable step assembly 16 is shown extending from the tailgate 12 to provide a convenient step 18 used for ingress and egress from the truck. The retractable step assembly 16 is supported by the step support members 20. The riser 30 holds the workpiece support bar 28 in a generally horizontal orientation to provide a workpiece support surface 42 on the top of the workpiece support bar 28.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A truck tailgate assembly comprising:
    a tailgate defining a receptacle inside the tailgate;
    a step attached to the tailgate by a pair of step support members that are receivable in the receptacle and extendable from the receptacle; and
    a pair of horizontal working surface support bars attached to the step support members provided above the step and rearward of the tailgate when the tailgate is open for supporting a workpiece while work is performed on the workpiece.

2. The truck tailgate assembly of claim 1 further comprising:
    a pair of risers each attached to one of the step support members and the workpiece support bar.

3. The truck tailgate assembly of claim 2 wherein a distal end of each of the workpiece support bars is fixedly connected at a right angle to a top end of each of the risers.

4. The truck tailgate assembly of claim 2 wherein the step support members each include a tailgate end where the step support members are pivotally attached to the tailgate and a step end connected to the step, wherein right and left attachment assemblies each further comprise:
    a first connector detachably connecting the workpiece support bar to the tailgate end of one of the step support members; and
    a second connector detachably connecting one of the risers to the step end of one of the step support members.

5. The truck tailgate assembly of claim 4 wherein the first and second connectors are pins having a pull ring that may be grasped to remove and install the pins, and a detent ball that retains the pins in the workpiece support bars and the risers.

6. The truck tailgate assembly of claim 2 wherein the workpiece support bars and the risers are three-sided channels each defining an open side that receives a portion of the step support members in the open side.

7. The truck tailgate assembly of claim 2 wherein each of the workpiece support bars further comprise:
    a pivot connector that pivotally secures a distal end of the workpiece support bar to a top end of the riser.

* * * * *